US012580854B2

(12) United States Patent
Garcia-Luna-Aceves

(10) Patent No.: US 12,580,854 B2
(45) Date of Patent: Mar. 17, 2026

(54) TECHNIQUES FOR LOOP-FREE MULTI-PATH INTER-DOMAIN ROUTING IN COMMUNICATIONS NETWORKS

(71) Applicant: The Regents of the University of California, Oakland, CA (US)

(72) Inventor: Jose Joaquin Garcia-Luna-Aceves, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 73 days.

(21) Appl. No.: 18/610,346

(22) Filed: Mar. 20, 2024

(65) Prior Publication Data

US 2024/0364624 A1 Oct. 31, 2024

Related U.S. Application Data

(60) Provisional application No. 63/498,826, filed on Apr. 28, 2023.

(51) Int. Cl.

| | |
|---|---|
| ***G06F 15/173*** | (2006.01) |
| ***H04L 45/00*** | (2022.01) |
| ***H04L 45/02*** | (2022.01) |
| ***H04L 45/12*** | (2022.01) |

(52) U.S. Cl.
CPC ............ *H04L 45/566* (2013.01); *H04L 45/02* (2013.01); *H04L 45/123* (2013.01)

(58) Field of Classification Search
None
See application file for complete search history.

(56) References Cited

U.S. PATENT DOCUMENTS

| | | | | |
|---|---|---|---|---|
| 6,041,049 | A * | 3/2000 | Brady | H04L 45/02 370/428 |
| 7,889,655 | B2 * | 2/2011 | Retana | H04L 45/04 370/235 |
| 8,612,576 | B1 * | 12/2013 | Brandwine | H04L 45/04 709/224 |
| 9,660,825 | B2 * | 5/2017 | Garcia-Luna-Aceves | H04L 12/185 |
| 2008/0175244 | A1 * | 7/2008 | Iyer | H04W 40/26 370/469 |

(Continued)

OTHER PUBLICATIONS

Beijnum et al., "Loop-Freeness in Multipath BGP through Propagating the Longest Path", 2009 IEEE International Conference on Communications Workshops, 2009, 6 pages.

(Continued)

*Primary Examiner* — Phuoc H Nguyen
(74) *Attorney, Agent, or Firm* — Wolter Van Dyke Davis, PLLC; Eugene J. Molinelli; Michael W. Taylor

(57) ABSTRACT

Techniques for routing in communications networks include receiving, at a first border node in a first autonomous system (AS) from a neighbor node in a second AS, a first routing control packet for a route to a destination node. The packet indicates a first ordered list of ASes involved in the route in an order each AS is traversed along the route. If the first ordered list does not include the first AS then a loop free route to the destination node is accepted by storing a route that indicates an updated ordered list that includes the ordered list and also indicates the second AS. A second routing control packet that indicates the destination node and the updated ordered list is sent to neighbors.

8 Claims, 6 Drawing Sheets

(56) References Cited

U.S. PATENT DOCUMENTS

| | | | | |
|---|---|---|---|---|
| 2016/0080502 | A1* | 3/2016 | Yadav | H04L 47/825 709/227 |
| 2020/0067822 | A1* | 2/2020 | Malhotra | H04L 12/2881 |
| 2020/0366593 | A1* | 11/2020 | Kaplan | H04L 45/308 |

OTHER PUBLICATIONS

Chau et al., "Towards a Unified Theory of Policy-Based Routing", IEEE, 2006, 12 pages.
Cisco et al., "Select BGP Best Path Algorithm", available online at: <https://www.cisco.com/c/en/us/support/docs/ip/border-gateway-protocol-bgp/13753-25.html>, retrieved on Dec. 2, 2024, 12 pages.
Estrin et al., "A protocol for route establishment and packet forwarding across multidomain internets", IEEE/ACM Transactions on Networking, vol. 1, No. 1, Feb. 1993, 15 pages.
Gao et al., "Stable Internet routing without global coordination", IEEE/ACM Transactions on Networking, vol. 9, No. 6, Dec. 2001, pp. 681-692.
Griffin et al., "A safe path vector protocol", Proceedings IEEE Infocom 2000. Conference on Computer Communications. Nineteenth Annual Joint Conference of the IEEE Computer and Communications Societies, 2000, pp. 490-499.
Griffin et al., "An analysis of BGP convergence properties", Acm Sigcomm Computer Communication Review, vol. 29, No. 4, Aug. 30, 1999, pp. 277-288.
João Luis Sobrinho, "Network routing with path vector protocols: theory and applications", SIGCOMM '03: Proceedings of the 2003 conference on Applications, technologies, architectures, and protocols for computer communications, Aug. 25, 2003, pp. 49-60.
Labovitz et al., "Delayed Internet Routing Convergence", Acm Sigcomm Computer Communication Review, vol. 30, No. 4, Aug. 28, 2000, pp. 175-187.
Mao et al., "Route flap damping exacerbates internet routing convergence", SIGCOMM '02: Proceedings of the 2002 conference on Applications, technologies, architectures, and protocols for computer communications, Aug. 19, 2002, pp. 221-233.
Musunuri et al., "A complete solution for iBGP stability", 2004 IEEE International Conference on Communications, 2004, pp. 1177-1181.
Rekhter et al., "A Border Gateway Protocol 4 (BGP-4)", Network Working Group Request for Comments: 4271 Obsoletes: 1771 Category: Standards Track , Jan. 2006, 104 pages.
Smith et al., "Herding packets: Properties needed of metrics for loop-free & best forwarding paths", 2017 International Conference on Computing, Networking and Communications (ICNC), 2017, 7 pages.
Xu et al., "MIRO: multi-path interdomain routing", SIGCOMM '06: Proceedings of the 2006 conference on Applications, technologies, architectures, and protocols for computer communications, Aug. 11, 2006, pp. 171-182.

* cited by examiner

FIG. 7A
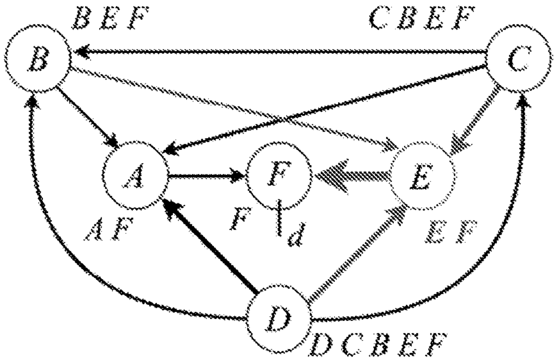
FIG. 7B
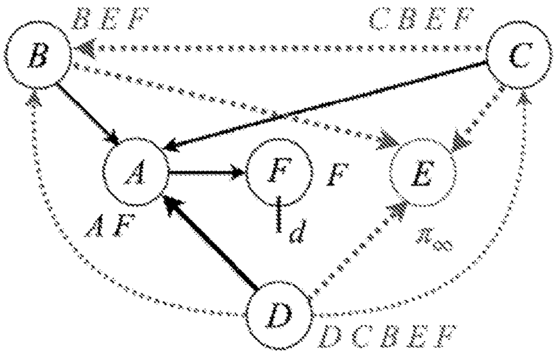
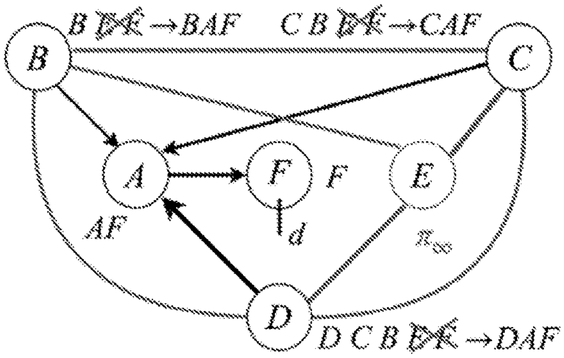
FIG. 7C
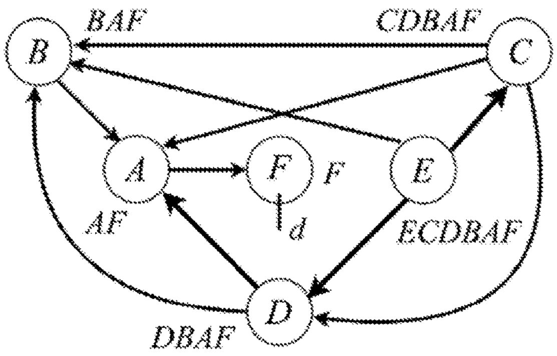
FIG. 7D

TECHNIQUES FOR LOOP-FREE MULTI-PATH INTER-DOMAIN ROUTING IN COMMUNICATIONS NETWORKS

This application claims benefit of Provisional Appln. 63/498,826, filed Apr. 28, 2023, the entire contents of which are hereby incorporated by reference as if fully set forth herein, under 35 U.S.C. § 119(e).

BACKGROUND

Networks of general-purpose computer systems connected by external communication links are well known and widely used in commerce. The networks often include one or more network devices that facilitate the passage of information between the computer systems. A network node is a network device or computer system connected by the communication links. An end node is a node that is configured to originate or terminate communications over the network. An intermediate network node facilitates the passage of data between end nodes.

Communications between nodes are typically affected by exchanging discrete packets of data. Information is exchanged within data packets according to one or more of many well-known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The header for a particular protocol typically indicates a type for the next protocol contained in its payload. The higher layer protocol is said to be encapsulated in the lower layer protocol.

The headers included in a packet traversing multiple heterogeneous networks, such as the Internet, typically include a physical (layer 1) header, a data-link (layer 2) header, a network (layer 3) header and a transport (layer 4) header, as defined by the Open Systems Interconnection (OSI) Reference Model. The OSI Reference Model is generally described in more detail in Section 1.1 of the reference book entitled Interconnections Second Edition, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Some network layer addresses, including IP addresses, are hierarchical and can be aggregated. Hierarchical addresses are organized into numerous groups and subgroups and subgroups of subgroups, etc. Each layer of subgroups successively narrow the address space until at the finest level of granularity of the address space, a single element of the network is indicated (e.g., a network interface card on a network node). A group address aggregates the addresses in the subgroups of that group. Routing on the Internet is supported by routing protocols that operate within an autonomous system (AS), and routing protocols that operate across ASes. Each AS is a collection of routing prefixes under the control of network operators working on behalf of a single administrative authority or domain, such that the same well-defined set of policies for routing is used throughout the AS. Each AS includes one or multiple computer networks connected with each other. Routing across ASes is based on an inter-AS routing protocol, which today is the Border Gateway Protocol (BGP). BGP is intended to: (a) allow the use of routing policies that take into account local preferences within each AS that need not be known by other ASes, and (b) use signaling among ASes that results in all routers computing stable paths to destinations in different ASes.

Routers and switches are network devices that determine which communication link or links to employ to support the progress of data packets through the network. A network node that determines which links to employ based on information in the internetwork header (layer 3) is called a router. Some protocols pass protocol-related information among two or more network nodes in special control packets that are communicated separately, and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

BGP is an example of a path-vector protocol in which routers share complete path information using control plane messages. For the case of BGP, the path to a given destination consists of the ASes traversed along the path.

A routing table stored at each router holds data that indicates, for each adjacent node, a list of destinations reached by that node and a cost of using that node to get to that destination. Cost can be determined in any way, from number of hops to the destination, to congestion on any or all hops to the destination, to any other factor known in the art. A valid successor is the neighbor on a route from the current node that reaches the destination at the lowest cost (including the cost from the current node to that neighbor).

SUMMARY

Techniques are provided for establishing loop-free routes across Autonomous Systems (ASes) in a communications network.

In a first set of embodiments, a method is implemented on a processor of a border node in a communications network to report a route to a destination in a different autonomous system. The method includes receiving, at a first border node in a first autonomous system from a neighbor second border node in a second autonomous system, a first routing control packet for a route to a destination node. The control packet indicates the destination node and a next hop node in the second autonomous system and a first ordered list of any other autonomous systems involved in the route. The ordered list indicates each autonomous system in an order each autonomous system is traversed along the route. The method also includes determining whether the first ordered list indicates the first autonomous system. If the first ordered list does not include the first autonomous system, then the method further includes accepting a loop free route to the destination node by storing and sending an updated ordered list. The updated ordered list is stored in a routing table at the first border node in a route record for the destination node that indicates the destination node and the neighbor second border node. The updated ordered list includes the ordered list and also indicates the second autonomous system. Sending includes sending a second routing control packet to neighboring nodes in the first autonomous system, wherein the second routing control packet indicates the destination node and the updated ordered list.

In some embodiments of the first set, the first ordered list indicates no route exists if the second autonomous system has lost connection with the destination node. In some embodiments of the first set, the ordered list indicates a unique value for each autonomous system indicated. In some of these embodiments, the unique value for each autonomous system is based on a label for such an autonomous system or a cost of traversing such autonomous system or some combination.

In some embodiments of the first set, upon receiving at an arbitrary node in the first autonomous system a third routing control packet that indicates a request for a route to the destination node, the method further includes: selecting a preferred route from a preferred route record from a routing table at the arbitrary node; and, sending a fourth routing control packet that indicates the preferred route. The preferred route record includes an ordered list that has a value greater than or equal to any different value for any different route record from the routing table at the arbitrary node.

In a second set of embodiments, a method is implemented on a processor of a non-border node in a communications network to report a route to a destination in a different autonomous system. This method includes receiving, at a first node in a first autonomous system from a neighbor node in the first autonomous system, a first routing control packet that indicates a destination node and an ordered list of any different autonomous systems involved in the route. The ordered list indicates each different autonomous system in an order each different autonomous system is traversed along the route. The method also includes storing, in a routing table at the first node, a route record for the destination node that indicates the destination node and the neighbor node and the ordered list.

In some embodiments of the second set, upon receiving a second routing control packet that indicates a request for a route to the destination node, the method further includes: selecting a preferred route from a preferred route record from the routing table, wherein the preferred route record includes an ordered list that has a value greater than or equal to any different value for any different route record for the destination node from the routing table; and, sending a fourth routing control packet that indicates the preferred route.

In other sets of embodiments, a computer-readable medium, an apparatus or a system is configured to perform one or more steps of one or more of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 7A though FIG. 7D are block diagrams that illustrate SURPRISE, a problem in BGP solved by OBGP, according to an embodiment.

DETAILED DESCRIPTION

Figure 1:
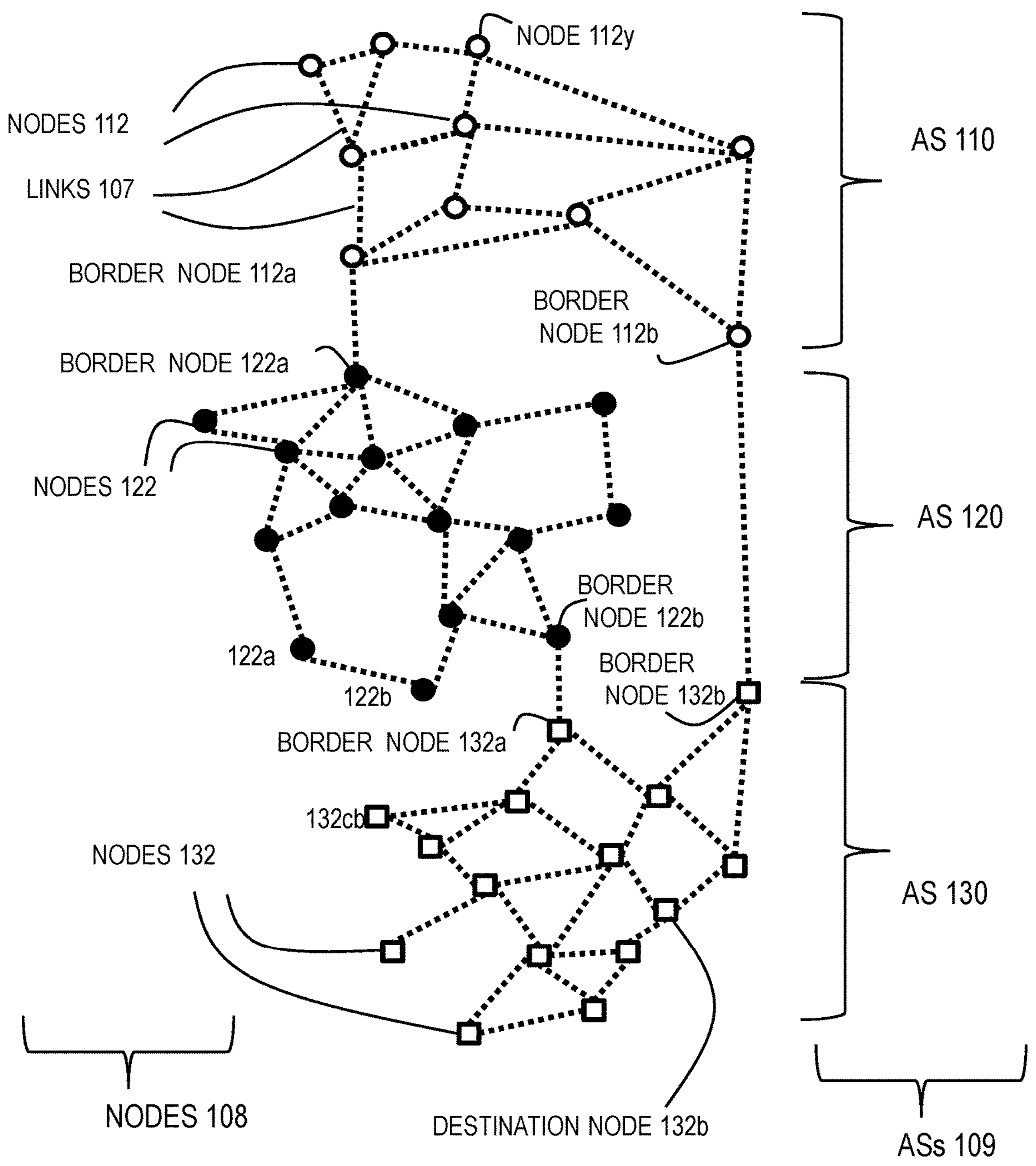
FIG. 1 is a block diagram that illustrates example multiple autonomous systems (ASes) in a communications network, according to an embodiment.

Techniques are described for determining one or more loop free routes across multiple Autonomous systems (ASes) in communications networks. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of distance as a cost function in an ad hoc wireless mobile communications network. However, the invention is not limited to this context. In other embodiments any cost function known in the art, such as number of hops, congestion, noise or availability among other metrics, alone or in combination, can be used in place of "distance," operating on ad hoc mobile or fixed, wired or wireless nodes in a communications network.

The Border Gateway Protocol (BGP) is designed to provide a single path from an AS to a destination, and a BGP update control packet carries information about the AS path traversed by a routing update from an originating AS to a destination address range. Unfortunately, BGP is well known to have non-termination and route oscillation problems. Considerable work has been carried out to address the limitations of BGP; however, there has not been a verifiable approach to make BGP stable and loop-free for routing across ASes.

1. OVERVIEW

Signaling among ASes that results in all routers computing stable paths to destinations in different ASes while still allowing different local routing preferences within each AS is herein called a routing etiquette because it specifies a code of polite behavior adopted and followed by all routers of a group. A routing etiquette does not require routers to select routes based on any system-wide optimality criteria, or to state their local preferences publicly, or to make all routers use the same routing preferences.

The techniques presented here introduce an algebraic framework for routing etiquettes, which is used to define inter-domain routing that modifies only the policy mechanisms of BGP to attain stable, loop-free, multi-path routing across ASes in the Internet, without requiring changes in the signaling defined for the border routing protocol (e.g., BGP). The algebra is called the Ordered Path Etiquette for Routing Algebra (OPERA); and, is the first algebra that formalizes routing etiquettes for implementation at the border between ASes. A routing embodiment that implements such an etiquette is presented. This embodiment provides proven sufficient conditions for stable and loop-free operation of routing protocols based on OPERA. In example embodiments, an Internal BGP (IBGP) routing within a single AS is assumed to operate without causing loops, such as by using a fully meshed IBGP or other methods known in the art. The example embodiments modify External BGP (EBGP) operation to eliminate loops in routes across multiple ASes.

FIG. 1 is a block diagram that illustrates as an example multiple autonomous systems (ASes) in a communications network, according to an embodiment. For purposes of illustration, three ASes are depicted, labeled AS 110, AS 120 and AS 130, collectively referenced herein as ASes 109, but in other embodiments more or fewer ASes 109 are involved. Each AS 109 may include many nodes 108. Each node 108 is in direct communication with one or more adjacent nodes via links 107 depicted as dotted line segments. The nodes 108 of AS 110 are depicted as open circle nodes 112; the nodes 108 of AS 120 are depicted as solid circle nodes 122; and the nodes 108 of AS 130 are depicted as open square nodes 132.

Techniques are described herein for finding routes from a node in one autonomous system (e.g., node 112*y* in AS 120) to a destination node in a different autonomous system (e.g., destination node 132*b* in AS 130). Such routes will pass between the two or more ASes 109 through a border node, such as border node 112*a* or 112*b* in AS 110, border node 122*a* or 122*b* in AS 120 and border nodes 132*a* and 132*b* in AS 130. According to various embodiments, a border node includes a routing table that indicates not only the next hops to the destination node 132*b* but also the full set of ASes along each path. This can be used to both select a single path and to avoid loops along paths to destination node 132*b*. The indication of such paths is supported by the etiquette algebra OPERA described below. For example, when a node in AS 110 has data packets to destination node 132*b* in AS 130, the node can simply forward the data packet to either border node 122*a* or 122*b*. Each border node maintains one or multiple routes to destination nodes in other ASes that are loop-free by means of the OBGP procedure described subsequently.

2. ROUTING ETIQUETTE

Although extensive work exists on protocols for loop-free multipath routing within an AS (e.g., [17]) there is very limited work on multipath loop-free routing across ASes. Recently, however, van Beijnum et al. [15] presented an approach to support multipath routing in BGP by requiring BGP routers to communicate the routes with the longest AS-paths among the routes locally available for each destination. While these techniques may help improve the convergence speed of BGP in some cases, none can guarantee convergence or avoid the occurrence of routing-table loops.

Few alternatives to BGP have been proposed for inter-AS routing. The Inter-Domain Policy Routing (IDPR) [4] architecture adopted a "link state" approach for the support of inter-AS routing. It did not receive much support because of its complexity and the need to modify the data plane. The Inter-Domain Routing Protocol (IDRP) [1] was a protocol for inter-AS routing proposed as an international standard that includes BGP as a proper subset. MIRO [16] is a multi-path approach to inter-AS routing in which routers learn default routes through the existing BGP protocol, and arbitrary pairs of ASes negotiate the use of additional paths that are bound to tunnels in the data plane.

Many routing algebras have been presented to formalize the way in which routes are computed in path-vector protocols. In particular, Sobrinho [14] has shown that a path-vector protocol can be made to converge to stable routes if and only if the routing algebra on which it is based is monotone. As used herein, monotone means that the weight of a path, which is obtained based on some metrics defined in the algebra, cannot decrease when the path is extended. However, Sobrinho offers only preliminary ideas on how to apply the algebra to BGP or any other AS border protocol.

Chau et al. [3] present a unified treatment of previous work routing algebras based on total ordering [2], [14] to present sufficient conditions for the existence of stable paths when routing protocols that operate on the basis of local policies for path selection are used. In contrast to this work, OPERA can be used to address necessary and sufficient conditions for stable and loop-free operation of routing protocols.

OPERA enables the design of stable and loop-free routing protocols based on a routing etiquette that accommodates local preferences, rather than on the use of a routing metric that renders system-wide optimal values. OPERA is designed to be monotone in order to allow the design of protocols based on it to converge. To state that a protocol converges means the protocol selects one or multiple loop free routes that reach the destination node, or determine that no valid paths exist.

The following terminology is used herein to describe OPERA: (a) $\mathbb{Z}+$ and R are the sets of positive integers and real numbers, respectively; (b) N is a set of nodes; (c) E is the set of edges with each edge connecting two nodes; (d) a node in N is denoted by a lower-case italicized letter n followed by a italicized letter index, e.g., na, nb, etc.; (e) a direct link between nodes na and nb in N is denoted by parentheses and colon, e.g., (na; nb), and nodes na and nb are said to be immediate neighbors of each other or adjacent; (f) the set of nodes that are immediate neighbors of node na is denoted by Nna; and (g) the set of paths P from node na to destination node nd are indexed by the lower case italicized letter j, j=1, J for a set of J paths from node na to destination node nd, wherein each path is denoted by $P_{nd}^{na}(j)$.

Using this notation, one can view the path $P_{nd}^{na}(j)$, and uniquely describe that path, as a sequence of links along the path, or as a sequence of nodes along the path. Such a path can also be viewed as an augmentation of an extant path $P_{nd}^{nb}(i)$ i=1, I for I possible paths to the destination nd from the next node nb or next link (na:nb). Thus, the path can be designated by either the link sequence expression in Equation 1a or node sequence expression in Equation 1b.

$$P_{nd}^{na}(j) = (na{:}\ nb)P_{nd}^{nb}(i) \tag{1a}$$

$$P_{nd}^{na}(j) = na\,P_{nd}^{nb}(i) \tag{1b}$$

In some embodiments, the notation is extended to indicate the next hop along the jth path from na to destination node nd, $P_{nd}^{na}(j)$ which is designated $h_{nd}^{na}(j)$, and obviously refers to a particular neighbor node, e.g., nb. Using this notation, Equation 1a and Equation 1b can be rewritten as Equation 1c and Equation 1d, respectively.

$$P_{nd}^{na}(j) = (na{:}\ h_{nd}^{na}(j))P_{nd}^{h_{nd}^{na}(j)}(i) \tag{1c}$$

$$P_{nd}^{na}(j) = na\,P_{nd}^{h_{nd}^{na}(j)}(i) \tag{1d}$$

OPERA uses path identifiers based on the expressions of Equation 1a through 1d and defines a particular routing etiquette RE using values or expressions of up to 12 parameters. Thus, a particular routing etiquette is defined by a tuple RE given by parameters listed in Equation 2 and introducing the following notation.

$$RE = (I, W, \Pi, \Omega, M, \mu 0, \mu_\infty, \varphi_\omega, \varphi_\pi, \leq_\omega, <_\pi, \varphi_\varepsilon) \tag{2}$$

I is a set of node identifiers in which each such identifier is uniquely assigned to a node. I can be a subset of the set of alphanumeric strings, or a subset of $\mathbb{Z}+$. Here it is assumed that $I \subset \mathbb{Z}+$, and the identifier of a node is denoted by a lower-case letter following the symbol n.

W is a set of link weights in which each link weight describes performance- or policy-based characteristics of the link. The weight of the link from node na to node nb is denoted by w(na, nb).

$\Pi$ is the set of path labels in which each path label is assigned uniquely to a path from an origin node to a destination node. The path label of path $P_{nd}^{na}(j)$ is denoted by $\pi_{nd}^{na}(j)$ and consists of the ordered sequence of node identifiers corresponding to the nodes along the path starting with na and ending with nd.

$\Omega$ is the set of path weights, where each such path weight describes performance- or policy-based characteristics of a path based on link weights. The weight of path $P_{nd}^{na}(j)$ is denoted by $\omega_{nd}^{na}(j)$.

M is the set of routing-metric values. Thus, in general, the routing metric value of path $P_{nd}^{na}(j)$ is denoted by $\mu_{nd}^{na}(j)$, and is defined by the tuple $[\omega_{nd}^{na}(j), \pi_{nd}^{na}(j)]$.

$\mu_0$ is the initial path metric assigned to a known destination for which a path can be found. By definition, $\mu_0=[\omega_0, \pi_0]$, where v and $\pi_0$ are the initial path weight and label associated with a known reachable destination, respectively.

$\mu_\infty$ is the routing-metric value assumed for an unreachable or unknown destination. By definition, $\mu_\infty=[\omega_\infty, \pi_\infty]$, where $\omega_\infty$ and $\pi_\infty$ are the path weight and path label associated with an unknown or unreachable destination, respectively.

$\varphi_\omega$ is a path-weight function (PWF) that takes as inputs the link weight w(na, nb) of the link from a node na to a node nb and a path weight $\omega_{nd}^{nb}(i))$ associated with path $P_{nd}^{nb}(i)$ from nb to nd and returns a path weight $\omega_{nd}^{na}(j)$ associated with the extended path $P_{nd}^{na}(j)$ as given by Equation 1b.

$\varphi_\pi$ is a path-label function (PLF) that takes as inputs a node identifier na and a path label $\pi_{nd}^{nb}(i)$ associated with path $P_{nd}^{nb}(i)$ from nb to nd and returns a path label $\pi_{nd}^{na}(i)$ associated with the extended path $P_{nd}^{na}(j)$ as given by Equation 1b.

The symbol $\leq_\omega$ refers to a weight-induced order relation defined for any three path weights $\omega_{nd}^{na}(j)$, $\omega_{nd}^{nb}(j)$, $\omega_{nd}^{nc}(j)$, such that the following properties are satisfied.

1) Reflexivity, i.e., $\omega_{nd}^{na}(i) \leq_\omega \omega_{nd}^{na}(i)$.
2) Transitivity, i.e., for any three different nodes na≠nb≠nc, if $\omega_{nd}^{na}(i) \leq_\omega \omega_{nd}^{nb}(j)$ and $\omega_{nd}^{nb}(j) \leq_\omega \omega_{nd}^{nc}(k)$ then $\omega_{nd}^{na}(j) \leq_\omega \omega_{nd}^{nc}(k)$
3) Antisymmetry, i.e., if $\omega_{nd}^{na}(i) \leq_\omega \omega_{nd}^{nb}(j)$ and $\omega_{nd}^{nb}(j) \leq_\omega \omega_{nd}^{na}(i)$ then $\omega_{nd}^{na}(i) = \omega_{nd}^{nb}(j)$
4) Totality, i.e., $\omega_{nd}^{na}(i) \leq_\omega \omega_{nd}^{nb}(j)$ or $\omega_{nd}^{nb}(j) \leq_\omega \omega_{nd}^{na}(i)$.

The symbol $<_\pi$ refers to a label-induced order relation defined for any three path labels $\pi_{nd}^{na}(j)$, $\pi_{nd}^{nb}(j)$, $\omega_{nd}^{nc}(j)$, with a, b, and c being three different nodes, i.e., na≠nb≠nc, such that the following properties are satisfied.

1) Irreflexivity, i.e., $\pi_{nd}^{na}(i)$ NOT$<_\pi \pi_{nd}^{na}(i)$.
2) Transitivity, i.e., if $\pi_{nd}^{na}(i) <_\pi \pi_{nd}^{nb}(j)$ and $\pi_{nd}^{nb}(j) <_\pi \pi_{nd}^{nc}(k)$ then $\pi_{nd}^{na}(j) <_\pi$nb $\pi_{nd}^{nc}(k)$
3) Totality, i.e., $\pi_{nd}^{na}(i) <_\pi \pi_{nd}^{nb}(j)$ or $\pi_{nd}^{nb}(j) <_\pi \pi_{nd}^{na}(i)$.

$\varphi_\varepsilon$ is an etiquette function. Its inputs are the identifier of a destination nd, the set of locally-selected paths to that destination, and the identifier of a neighbor node nn. Its output is either $\mu_\infty$ or the routing-metric value associated with one of the locally-selected paths for destination nd.

OPERA does not mandate how nodes (routers or groups of routers) should select paths locally, PWF and PLF can be used in any order and in combination, and path selection functions need not be the same in every node. The monotonicity of OPERA follows directly from the properties of $\leq_\omega$ and $<_\pi$.

While a typical routing protocol operates on the notion that routers always attempt to select an optimum path to a destination based on choices available and a total ordering of routing metric values. A different definition of convergence is advantageous for routing etiquettes in which routers select paths based on local preferences that may be private and the routes selected need not be optimum according to a system-wide metric. This section formalizes the notion of convergence without optimality by ensuring the polite behavior of routers. Polite behavior among routers (i.e., a routing etiquette) can be established in the context of OPERA in many different ways based on the ordering of paths established by means of the label-induced order relation $<_\omega$.

To demonstrate the use of such OPERA relations, an embodiment is described in which labels are used as the routing metric μ and the label-induced order relation $<_\pi$ is defined to avoid loops as given in Equation 3a, in which nodes na and nb are reversed compared to the order used in the definition of the properties given above. In Equation 3, the absolute value of a path label denotes the number of hops along the path, e.g., $|\pi_{nd}^{na}(j)|$ indicates the number of hops along path $P_{nd}^{na}(j)$. In the following, think of each node as a distinct AS.

$$\pi_{nd}^{nb}(i) <_\pi \pi_{nd}^{na}(j) \equiv \{na \notin \pi_{nd}^{nb}(i)\} \quad (3a)$$

AND $$\{[|\pi_{nd}^{nb}(i)| < |\pi_{nd}^{na}(j)|] \text{ OR } [\langle|\pi_{nd}^{nb}(i)| = |\pi_{nd}^{na}(j)|\rangle \text{ AND } \langle nb < na\rangle]\}$$

Note that, by definition of the relationship as given by the first term on the right-hand side of Equation 3a, the identifier for node na is not in the path label for the path from node nb to destination node nd. The conditions of $<_\pi$ are satisfied because the node identifiers are assigned uniquely to nodes as positive integers and the size of path labels are also positive integers.

A path to destination nd is said to be feasible if it does not contain any node more than once, i.e., it does not involve a loop.

A routing protocol is said to converge to feasible routes (i.e., to be stable) for a given destination nd after topology changes stop occurring at time T if: (1) for any destination nd that a node nk can reach, node nk obtains at least one path $P_{nd}^{nk}(i)$ within a finite time after T, such that $\pi_{nd}^{nk}(i)<\mu_\infty$ and does not include any node identifier more than once; (2) for any unreachable destination nd for node nk, node nk sets $\pi_{nd}^{nk}(1)=\mu_\infty$ within a finite time after T; and (3) node nk does not change the value of any $\pi_{nd}^{nk}(i)$ within a finite time after T.

A routing protocol is loop-free if all the paths to a given destination nd implied by the routing information maintained by nodes define feasible paths at every instant. If node nk uses node nq as its next hop along a feasible path $P_{nd}^{nk}(i)$ to destination nd, and $P_{nd}^{nk}(i)=nkP_{nd}^{nq}(j)$, then $P_{nd}^{nq}(j)$ is better than $P_{nd}^{nk}(i)$, i.e., based on path labels, loop-free condition LF in Equation 3b is satisfied:

Label Condition LF $$\pi_{nd}^{nq}(j) <_\pi \pi_{nd}^{nk}(i) \quad (3b)$$

Note that condition LF is trivially true for a path that does not exist, because a node nk with no path to destination nd is assumed to have $\pi_\infty$ as its label for that destination, and $\pi_\infty$ is larger than any actual path label.

The following theorems and proofs are enabled using the OPERA notation and algebra for label-based paths. These theorems and proofs are provided for illustrative purpose only, and the embodiments do not depend on the validity or comprehensiveness of these proofs.

Theorem 1. A routing protocol based on OPERA is guaranteed to be loop-free if the ordering condition LF is satisfied at every instant by every node for any destination nd.

Proof. Assume that LF is true but the routing protocol is not loop-free and a loop L of h hops is created at some point in time with L={n1→n2→ . . . →n(h−1)→n1}. Without loss of generality, assume that each node has a single path to nd. This implies that $\pi_{nd}^{n1}(1)<_\pi\pi_{nd}^{n(h-1)}(i)$ and for each node nn thereafter $\pi_{nd}^{nn}(n)<_\pi\pi_{nd}^{n(n-1)}(n-1)$ for 1<n<h−1 if LF is true. However, this leads to a contradiction because it implies $\pi_{nd}^{n1}(1)<_\pi\pi_{nd}^{n1}(1)$, and for every nn up to h−1. None of these statements can be true because $|\pi_{nd}^{n1}(1)|$ NOT$<|\pi_{nd}^{n1}(1)|$ and nn NOT<nn. Therefore, the theorem is true.

Theorem 2. If a routing protocol based on OPERA ensures convergence to feasible routes for each destination nd, then the ordering condition LF must be satisfied by every node within a finite time after topology changes stop occurring.

Proof. The proof is by contradiction. Assume that a routing protocol based on OPERA had converged to feasible routes at time T but LF is not satisfied. From the definition of convergence to feasible routes, no node can change the path label of any path after time T and no node can transmit a signaling message to update a path label. Hence, node nk cannot change the label $\pi_{nd}^{nk}(i)$ of path $P_{nd}^{nk}(i)$ after time T. Let nq be the next hop along path $P_{nd}^{nk}(i)$. Node nk must have used the path label reported by nq to select nq as its next hop along $P_{nd}^{nk}(i)$, and that path label corresponds to a path $P_{nd}^{nq}(j)$ from nq to nd. Furthermore, $\pi_{nd}^{nq}(j)$ cannot change after time T. Because LF is not satisfied at time T, node nk can use nq as its next hop along path $P_{nd}^{nk}(i)=nkP_{nd}^{nq}(j)$, while node nq uses node nk as its next hop along path $P_{nd}^{nq}(j)=nqP_{nd}^{nk}(l)$ at time T. This is a contradiction, because then $P_{nd}^{nk}(l)$ and $P_{nd}^{nq}(j)$ cannot both be feasible paths. Therefore, the theorem is proved.

Theorem 3. If the ordering condition LF is satisfied by every node for any destination nd within a finite time after topology changes stop occurring, then a routing protocol based on OPERA ensures convergence to feasible routes.

Proof. This proof is also by contradiction. Let Ts be the time when topology changes stop occurring. Because LF must be satisfied within a finite time, at time To≥Ts, it must be true that Equation 3b is satisfied at time To by each node nk and its next hop along any path to any destination nd that is reachable. From Theorem 1, it follows that the routes to nd at each node are feasible. On the other hand, because each node computes routes based on OPERA, no node needs to update any route to destination nd after time To with each route being feasible, which is a contradiction to the assumption that some node is unable to converge to a feasible route to nd. Therefore, the theorem is proved.

Theorem 4. A routing protocol based on OPERA in which the ordering LF is satisfied at every instant by every node for any destination nd is guaranteed to be stable.

Proof. The proof follows directly from the proofs of the previous theorems.

The loop-detection mechanism in the import transformation of the conventional Border Gateway Protocol (BGP) does not enforce the LF condition of Equation 3b and thus cannot prevent transient loops due to inconsistent routing tables. It follows from Theorem 1 that BGP is not loop-free because the combination of its import transformation and local-preference function does not guarantee that the order relation LF is satisfied at every instant. Furthermore, it follows from Theorems 2 and 3 that BGP is inherently unstable (i.e., it cannot guarantee convergence within a finite time in all policy cases) because the combination of its import and export transformations and local-preference function does not guarantee that the order relation LF is satisfied within a finite time after the topology of the system becomes stable. Theorems 1 to 4 imply that a practical way to make BGP stable and loop-free is by using LF in its policy mechanisms for routing, and this is exactly what OPERA based BGP (OBGP) docs.

3. ORDERED BORDER GATEWAY PROTOCOL (OBGP)

OBGP involves introducing ordering among loop-free paths. This ordering is enacted based on the label-induced order relations ($<_\pi$) of OPERA. In an example embodiment, label-based ordering as stated in Eq. (2) is included as part of the import and export transformations of BGP. The local-preference function of BGP is augmented slightly to allow routers to use multiple loop-free routes to destinations without requiring the selected routes to be of equal weight or length or otherwise optimal.

3.1 OBGP Structures

Figure 2:
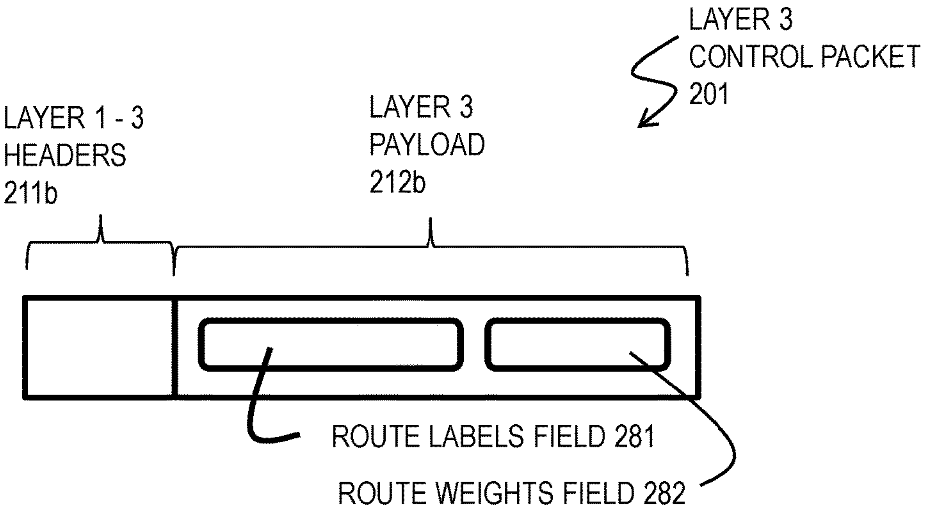
FIG. 2 is a block diagrams that illustrate an example control packet for an ordered border gateway protocol (OBGP), according to an embodiment.

FIG. 2 is a block diagrams that illustrate an example control packet 201 for an ordered border gateway protocol (OBGP), according to an embodiment. The headers for layers 1 through 3 are represented by box 211*b* and are not changed. These headers include both a node identifier (e.g., IP address) for a destination node and a node identifier for the node sending the packet. A payload 212*b* is modified. In some embodiments, payload 212*b* is modified to include route labels field 281 holding data that indicates the labels of at least all ASes included in a route in order of traversal. In some embodiments, labels for each node in the route are also included, in the order of traversal. In some embodiments, payload 212*b* is modified to include route weights field 282 holding data that indicates the weights of at least all ASes included in a route in order of traversal. In some embodiments, weights for each node in the route are also included, in the order of traversal. In some embodiments, both fields 181 and 182 are included.

Figure 3:
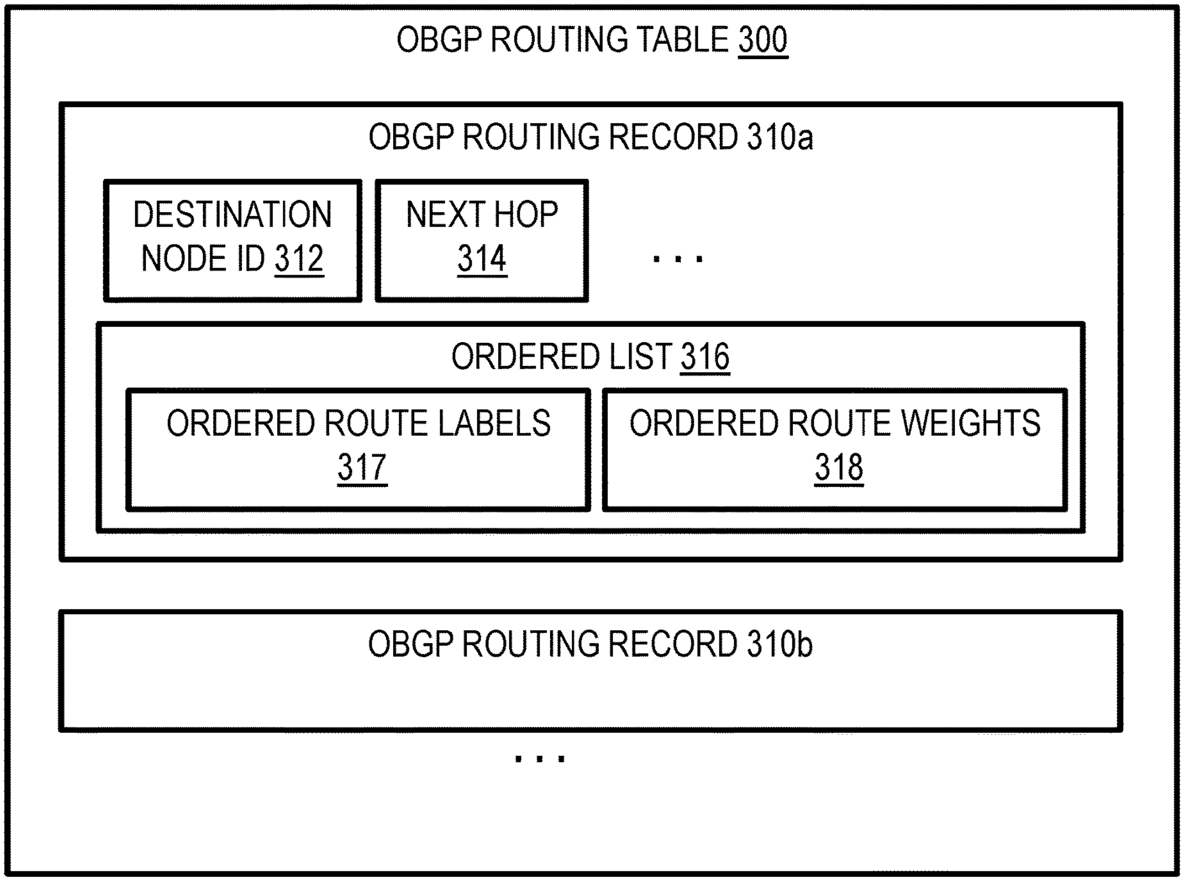
FIG. 3 is a block diagram that illustrates an example routing table at a router that implements OBGP, according to an embodiment.

FIG. 3 is a block diagram that illustrates an example routing table 300 at a router that implements OBGP, according to an embodiment. Such routing tables are included in all routers implementing OBGP, which in some embodiments are only border nodes. Each table includes one or more OBGP routing records, such as record 310*a* and 310*b* among others indicated by ellipses and termed collectively, routing records 310. Each routing record 310 includes a destination node ID field 312 that holds data that indicates a destination node identifier and next hop field 314 that holds data that indicates an identifier for the node that is the next hope on the route as well as other fields indicated by ellipses, such as link cost for the next hop and total cost within an AS, depending on the various routing preferences. For OBGP routers, each record 310 also includes an ordered list field 316. The ordered list field 316 includes either an ordered route labels field 317 or an ordered route weights field 318 or both. The ordered route labels field 317 holds data that indicates at least a list of labels of ASes traversed by the route in the order traversed. In some embodiments, labels of one or more nodes within each AS are also included in the list. The ordered route weights field 318 holds data that indicates at least a list of weights of ASes traversed by the route in the order traversed. In some embodiments, weights of one or more links within each AS are also included in the list.

Although data structures, messages and fields are depicted in FIG. 1 as integral blocks in a particular order for purposes of illustration, in other embodiments, one or more data structures or messages or fields, or portions thereof, are arranged in a different order, in the same or different number of data structures or databases in one or more hosts or messages, or are omitted, or one or more additional fields are included, or the data structures and messages are changed in some combination of ways.

3.2 OBGP Method

Each OBGP router advertises one route to any given destination nd if it has at least one loop-free path to the destination, and the OBGP router sends the same routes to all neighbor routers in other ASes, denoted in the following by a following lowercase letter, e.g. ASa, ASb, etc. In the example embodiment using only label-based ordering, the one route i=r (among/paths) advertised by a router in ASa to destination nd is denoted by $P_{nd}^{ASa}[r]$ and its label is denoted by $\pi_{nd}^{ASa}[r]$. Similar statements can be made for weight-based or metric-based ordering.

Because each router in an AS can advertise at most one route to any destination, a router in ASa cannot have more than one route to destination nd through a neighbor in another different ASb. $P_{ndASb}^{ASa}[r]$ denotes the route to destination nd stored at a router in ASa and reported by a router in another ASb, and $\pi_{ndASb}^{ASa}[r]$ denotes the corresponding path label. Similar statements can be made for weight-based or metric-based ordering.

The one route i=r advertised is selected from a set of paths corresponding to loop-free routes to destination nd that are locally available at a router in ASa. For example, if the set of path labels is denoted by $\pi_{nd}^{ASa}$ and the set of ASes directly connected to ASa is denoted by $A^a$, then Equation 4a follows.

$$\prod_{nd}^{ASa} = \{\pi_{ndASb}^{ASa} \mid ASb \in A^a\} \tag{4a}$$

The maximum path metric can also be defined. For example, the maximum path label in $\Pi_{nd}^{ASa}$ is denoted by $\pi\max_{nd}^{ASa}$ and is defined by Equation 4b.

$$\pi_{ndASb}^{ASa} <_\pi \pi\max_{nd}^{ASa} \; \forall \; \pi_{ndASb}^{ASa} \in \prod_{nd}^{ASa} - \{\pi\max_{nd}^{ASa}\} \tag{4b}$$

Where $\forall$ is the symbol meaning "for all." The path label of a non-existent path is $\pi_\infty$ and its size is defined to be $|\pi_\infty|=\infty$. Given that path labels state the node members of AS routes advertised by routers, it is possible to determine whether a path label is a subset of another label. The case in which a label value $\pi_{nd}^{ASb}[r]$ is contained in a label stored locally at router in ASa and reported by a router in ASy is denoted by Equation 4c.

$$\pi_{nd}^{ASb}[r] \in \pi_{ndASy}^{ASa} \tag{4c}$$

OBGP constrains an import transformation of BGP to accept routes only if the routes are ordered according to the LF condition, and to order the routes stored locally according to the LF condition (e.g., using Equation 3b for path labels).

For example, when a router in ASa receives an update with a route having path label $\pi_{nd}^{ASb}[r]$ from a neighbor router in ASb for destination nd, the ordered import transformation of OBGP consists of accepting $\pi_{nd}^{ASb}[r]$ only if the reported label is better than $\pi_{nd}^{ASa}[r]$ and to eliminate local routes for which the previous value of $\pi_{nd}^{ASb}[r]$ was a subset of the corresponding path labels. The OPERA border import constraint (OBi) for the OBGP import transformation for path labels is expressed as given by Equation 4d.

$$\text{Condition } OBi\text{: } \pi_{nd}^{ASb}[r] <_{\pi} \pi_{nd}^{ASs}[r] \tag{4d}$$

If OBi is satisfied, then the reported route from ASb is accepted and the route is updated at the router, e.g., $\pi_{nd}^{ASb}[r] \rightarrow \pi_{nd}^{ASa}[r]$ for path label-based routing. On the other hand, if OBi is not satisfied, the reported route is not accepted and the existing route stored locally is invalidated. For example, $\pi_{\infty} \rightarrow \pi_{nd}^{ASa}[r]$ in the path label routing table. In addition, once a route must be invalidated because of failure to satisfy OBi, or as a result of an update stating the invalidated value (e.g., $\pi_{\infty}$ for path label routing), a router in ASa must reset the values of those routes locally stored that contain the invalidated route, e.g., reset the labels to $\pi_{\infty}$. For example, let $\pi_{ndASb}^{ASa}$(old) and $\pi_{ndASb}^{ASa}$(new) denote the previous and updated value of the label for the path $P_{ndASb}^{ASa}$ from ASa to destination nd through ASb. A router in ASa also sets $\pi_{ndASc}^{ASa}$(new) to $\pi_{\infty}$ if the condition of Equation 4e is satisfied.

$$\left[\pi_{nd}^{ASb}(r) = \pi_{\infty}\right] \tag{4e}$$

AND $$\left[\pi_{ndASb}^{ASa}(\text{old}) \in \pi_{ndASc}^{ASa}(\text{old})\right]$$

This is done to cope more efficiently with failures of sessions between ASes.

The preference function defined for BGP, or implemented to date, is adapted in OBGP. The preference function is adapted to add the maintenance of the set of locally available routes for each destination, and determining the route that has the maximum value of a metric as defined previously. For example, using label-based routing in addition to the steps carried out by the BGP preference function, a router in ASa takes two steps for each destination nd. First, the router maintains the set of labels $\Pi_{nd}^{ASa}$. Second, the router updates $\pi\max_{nd}^{ASa}$ to be the maximum label in $\Pi_{nd}^{ASa}$ each time an update is made to $\Pi_{nd}^{ASa}$. From Equation 4b) and the definition of path label OPERA border export condition (OBe), described below, Equation 4f follows, where i=r is the route having the largest value of the label.

$$\pi_{nd}^{ASa}(i) <_{\pi} \pi_{nd}^{ASb}[r] \; \forall \; \pi_{nd}^{ASa}(i) \mp \pi_{nd}^{ASa}[r]\} \tag{4f}$$

OBGP constrains an export transformation of the protocol to select from multiple routes to destinations, without requiring that the routes have the same weights or path lengths. This is accomplished by having the route reported by a router in ASa for destination nd be the path corresponding to the maximum value of a metric among all the routes in $\Pi_{nd}^{ASa}$. The OPERA border export constraint (OBe) for the OBGP import transformation for path labels is expressed as given by Equation 5a, below. The constraint imposed by the ordered export transformation for a router na in ASa to inform all or only some of its neighbor routers of a new route $P_{nd}^{ASa}[r]$ for destination nd (depending on whether the router na is in provider, consumer or peer ASes) is given by Equation 5a.

Condition OBe $$\pi_{nd}^{ASa}[r] = na\,\pi\max_{nd}^{ASa} \tag{5a}$$

A router in ASa sends an update message with a new route record for destination nd if the value of the metric, e.g., $\pi_{nd}^{ASa}[r]$, changes. Furthermore, if the condition of Equation 5b is satisfied at a router na in ASa, for a label based routing, then the route is deactivated ($\pi_{nd}^{ASa}[r]=\pi_{\infty}$) and the router na sends an update message with a route withdrawal for destination nd, because the router na no longer has a route to nd guaranteed to be loop-free.

$$\pi_{ndASb}^{ASa} = \pi_{\infty} \; \forall \; \pi_{ndASb}^{ASa} \in \prod_{nd}^{Asa} \tag{5b}$$

Figure 4:
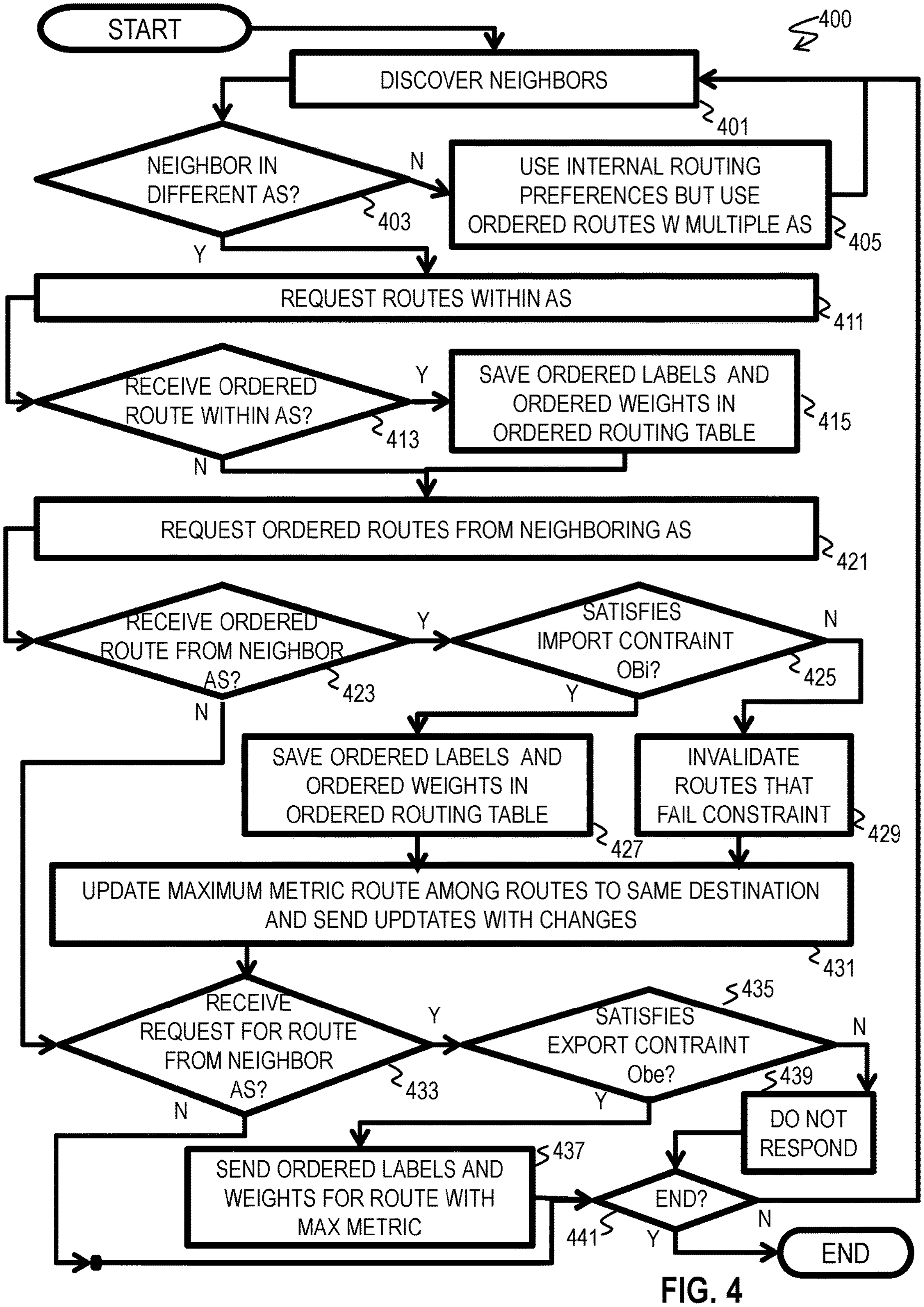
FIG. 4 is a flow diagram that illustrates an example method for OBGP implemented at a router, according to an embodiment.

FIG. 4 is a flow diagram that illustrates an example method 400 for OBGP implemented at a router, according to an embodiment. Although steps are depicted in FIG. 4 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 401 a router at a node discovers any new or departing neighbors. In step 403 it determines if any neighbor is a member of a different AS. If not, control passes to step 405 to use the local preferences for selecting routes within its own AS. In some embodiments, the local preferences included ordered routing and order-metric-based route selection. Step 405 includes recording ordered lists 316 in routing tables 300 for any routes that cross into one or more different ASes, as reported by any routers on border nodes and passed in router control packets 201. Step 405 includes replying to any routes request for destination in a different As with control packets that include data from the ordered lists, e.g., in ordered labels and or ordered weights. Control passes back to step 401 to discover any changes in neighbors.

If it is determined in step 403 that at least one neighbor is in a different AS, then the router is on a border node and control passes to step 411 and following. In step 411, the router requests routes for a destination node from all routers within the AS, including routes at any other border nodes with the same or other ASes. Often step 411 is performed in response to receiving control packet from a neighbor with a request for a route to the destination node.

In step 413 it is determined if an ordered route is received from a router within the AS, e.g., a control packet with field 281 or 282 is received that originated in a different border node in the same AS. If not, control passes to step 421. If so, the ordered labels and or weights are stored in the local routing table 300 in the ordered list portion 316 of a record 310 for the requested destination. Then control passes to step 421.

In step 421, the router requests ordered routes form the neighboring AS, e.g., from the neighboring node in a different AS. Often step 421 is performed in response to receiving control packet from a neighbor with a request for a route to the destination node.

In step 423 it is determined whether a routing control packet 201 is received from the neighbor in a different AS, which packet includes an ordered route, e.g., in response to the request sent in step 421, or unsolicited because of a change or update in some node or connection along a route. Thus step 423 includes receiving, at a first border node in a first autonomous system from a neighbor second border node in a second autonomous system, a first routing control packet for a route to a destination node, wherein the route indicates the destination node and a next hop node in the second autonomous system and a first ordered list of any other autonomous systems involved in the route, wherein the ordered list indicates each autonomous system in an order each autonomous system is traversed along the route. If not, control passes to step 433 described below. If so, control passes to step 425.

In step 425, it is determined whether the ordered route satisfies the import criterion for being greater than previous routes to the destination and avoiding loops, e.g., condition OBi given by Equation 4d for label-ordered routes, described in more detail below. Loops are avoided if the AS of the router is not included in the ordered list. Thus, step 425 includes determining if the first ordered list does not include the first autonomous system then accepting a loop free route. If not, the route is invalid and all routes relying on the reporting AS are invalidated, e.g., the routing ordered labels is set with a code that indicates no route exists, e.g. the value $\pi_\infty$. However, if the ordered route satisfies the import criterion, then control passes to step 427. In step 427, the label or weight or both of neighboring AS that reported the ordered route is added to the ordered list at the next position and the updated ordered list is saved in the local routing table including the ordered lists of labels and weights or both in fields 317 and 318, respectively. Thus step 427 includes storing in a routing table at the first border node a route record for the destination node that indicates the destination node and the neighbor second border node and an updated ordered list that includes the ordered list and also indicates the second autonomous system.

In step 431, the preferred route for a particular destination is determined from all the routes to that same destination, if more than one occurs in the routing table. The preferred route is the one with the maximum value of the metric determined from the ordered route, e.g., the maximum value of the label or maximum value of the weight or maximum value of the weighted labels. Thus step 431 includes selecting a preferred route from a preferred route record from a routing table at the arbitrary node, wherein the preferred route record includes an ordered list that has a value greater than or equal to any different value for any different route record from the routing table at the arbitrary node. If the preferred route has changed from a previous time, then an update is sent indicating the new preferred route and ordered list and maximum value of the metric. Thus step 431 includes sending a fourth routing control packet that indicates the preferred route. Control then passes to step 433.

In step 433, it is determined whether a control packet 201 is received from the neighbor border node of the other AS, which packet indicates a request for the route to a destination node. If not, control passes to step 441 to determine if the processing should end, as described below. If so, control passes to step 435.

In step 435, it is determined whether the ordered route satisfies the export criterion, e.g., to report only the route with the maximum value of the metric, e.g., condition OBe given by Equation 5a for label-ordered routes, described below. If not, then control passes to step 439 and the router does not respond to the request. However, if the export constraint is satisfied then control passes to step 437. In step 437, the ordered list is inserted into the payload 212*b* of a routing control packet 201, e.g., in fields 281 or 282 or both, and sent to the requesting node. Control then passes to step 441.

In step 441 it is determined whether the process should end, e.g., due to powering down, or leaving the network, or satisfying some other termination policy. If so, the process sends. Otherwise, control passes back to step 401 and the following described above.

3.3 OBGP Must Converge to Loop Free Routes if Such Exist.

Given Theorems 1 to 4, the following theorem implies that OBGP is loop-free and stable, i.e., that it must converge to feasible routes to destinations, if they exist, without ever creating a loop.

Theorem 5. Ordering along loop-free paths (L) is satisfied at every instant if OBGP is executed correctly.

Proof. The proof is by contradiction, i.e., by showing that having both OBGP executed correctly and LF not being satisfied by a router in an ASa for a given destination nd at some point in time T is a contradiction.

According to the correct implementation of OBGP, a router in ASa either has no route to a destination d, and thus $\pi_{nd}^{ASa}[r]=\pi_\infty$, or it has a route with $\pi_{nd}^{ASa}[r]<_\pi\pi_\infty$. In the first case, a router cannot negate the ordering constraint LF because it does not have any path to destination nd. The rest of the proof is directed to the second case.

If a router ny in ASa computes a finite route $P_{nd}^{ASa}[r]$ to destination nd at time T, then LF cannot be false if OBGP is executing correctly. Because, if OBGP is executed correctly, Equation 6a follows from the execution of the local-preference function at router ny, i.e., $$\pi_{nd}^{ASa}[r] = nb\,\pi_{ndnb}^{ASa}[r] \tag{6a}$$

with $$nb \in ASa$$

and $$\pi_{ndnb}^{ASa}[r] \in \prod\nolimits_{nd}^{ASa}.$$

Because router ny stores route $\pi_{ndnb}^{ASa}[r]$, Equation 6b follows from the execution of the ordered import transformation (Equation 4d), i.e., $$\pi_{ndnb}^{ASa}[r] = \pi_{nd}^{nb}[r] <_\pi \pi_{nd}^{ASa}[r] \tag{6b}$$

when the router at node ny accepts the route with label $\pi_{nd}^{nb}[r]$.

If router ny updates $\pi max_{nd}^{ASa}$ as a result of the new route it accepts with label $\pi_{nd}^{nb}[r]$, then it follows from the correct execution of the ordered export transformation (Equation 5a) that either Equation 6c or Equation 6d is true, i.e., $$\pi_{nd}^{nb}[r] <_\pi \pi\max_{nd}^{ASa} <_\pi \pi_{nd}^{na}[r] \quad (6c)$$

OR $$\pi_{nd}^{nb}[r] = \pi\max_{nd}^{ASa} <_\pi \pi_{nd}^{na}[r] \quad (6d)$$

The previous three facts constitute a contradiction to the assumption that ordering along loop-free paths given by Eq. (2)) is not true at some point in time when router ny computes a new finite route $P_{nd}^{ASa}[r]$. Therefore, theorem 5 is true.

3.4 OBGP Provides Advantages Over BGP

A few well-known cases of route oscillation and non-deterministic convergence in BGP are used to illustrate the advantage that OBGP is stable and loop-free in operation.

Case A. BAD-GADGET.

Figure 5A:
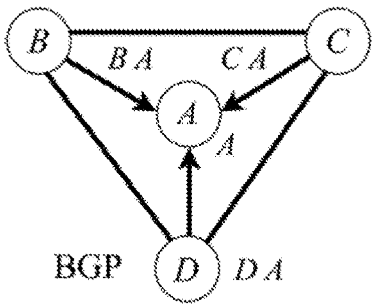
FIG. 5A though FIG. 5C are block diagrams that illustrate BAD GADGET, an unsolvable problem in BGP solved by OBGP, according to an embodiment.
Figure 5B:
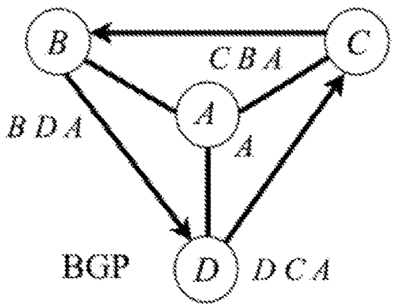
Figure 5C:
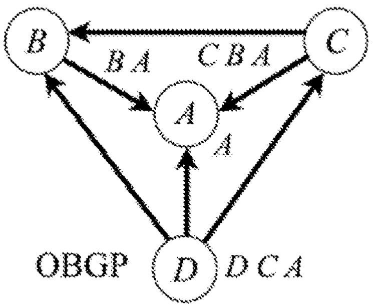

BAD GADGET [7] is a well-known example of an unsolvable BGP system, with no execution of BGP being capable of arriving to a stable routing state. FIG. 5A though FIG. 5C are block diagrams that illustrate BAD GADGET, an unsolvable problem in BGP solved by ordered BGP (OBGP), according to an embodiment. Circles represent distinct ASes and capital letters denote the AS identifiers, such that A<B<C<D to correspond to the original example in [7]. An intended destination nd is located at AS labeled A (denoted $AS_A$). In the BAD-GADET system, each AS has a local preference for a counter-clockwise route of length 2 over all other routes to $AS_A$. Hence, absent any ordering constraints, $AS_D$ would prefer route DCA, $AS_C$ would prefer route CBA, and $AS_B$ would prefer route BDA.

The initial updates communicated among routers are shown in FIG. 5A which shows routers in $AS_B$, $AS_C$ and $AS_D$ announcing routes of one AS hop (BA, CA, DA, respectively) to $AS_A$. The route announced by each AS is shown next to the circle representing the AS. Without any ordering and with routes in ASes reporting the one route they adopt, this leads to non-convergence and temporary routing-table loops. FIG. 5B shows one of many possible intermediate states assuming that the routers in an AS process the initial updates from the adjacent AS counterclockwise. Routers in $AS_D$ announce route DCA, routers in $AS_C$ announce route CBA, and routers in $AS_B$ announce route BDA, all of which induces a temporary routing-table loop, e.g., D to C to B to D etc. The loop is broken when routers process the new updates, at which point they reverse back to their original routes shown in FIG. 5A. However, routers keep engaging in route oscillations involving the states shown in FIG. 5A and FIG. 5B without termination after processing new updates from routers in other ASes.

By contrast, in OBGP, routers in $AS_B$ are unable to enact the local preference of using the route initially announced by $AS_D$ because $BA=\pi_{nd}^{ASB}[r]<_\pi\pi_{nd}^{ASD}[r]=DA$. However, routers in $AS_D$ can use routes announced by routers in $AS_C$ because $CA<_\pi DA$, and can also use routes announced by routers in $AS_B$ if local preferences allow because $BA<_\pi DA$. Similarly, routers in $AS_C$ can use the route announced by routers in AS B because $BA<_\pi CA$. As a result, the system converges deterministically to one or multiple routes to the final state shown in FIG. 5C independently of how fast updates are propagated and without routing-table loops ever being created.

Case B. DISAGREE.

Figure 6A:
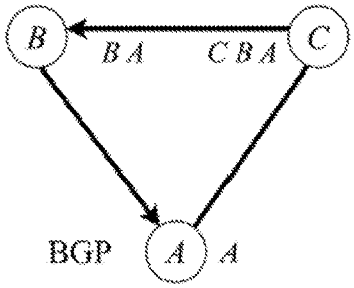
FIG. 6A though FIG. 6C are block diagrams that illustrate DISAGREE, a problem in BGP solved by OBGP, according to an embodiment.
Figure 6B:
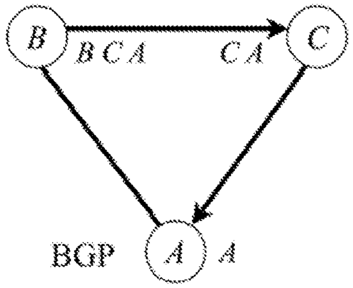
Figure 6C:
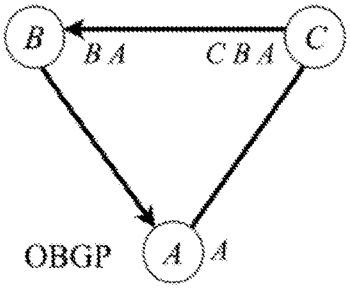

FIG. 6A though FIG. 6C are block diagrams that illustrate DISAGREE, a problem in BGP solved by OBGP, according to an embodiment. DISAGREE [7] is a well-known example of a BGP system that can have more than one stable routing states starting with the same initial routing state. FIG. 6A through FIG. 6C show destination nd located at $AS_A$, with A<B<C. As it is described in [7], the final routing states shown in FIG. 6A and FIG. 6B are possible and their occurrence depends on how updates propagate in the system. The reason for two final routing states being possible in BGP is that there is no ordering between the route announced by $AS_C$ and the routes locally available at $AS_B$. By contrast, the ordering established in OBGP among routes provides deterministic convergence, which results in the final routing state shown in FIG. 6C.

Case C. PRECARIOUS.

The PRECARIOUS case described in [7] is a combination of the BAD GADGET and DISAGREE cases. Because OBGP enforces topology-independent deterministic convergence, it provides deterministic convergence in the PRECARIOUS system, as well.

Case D. SURPRISE.

FIG. 7A though FIG. 7D are block diagrams that illustrate SURPRISE, a problem in BGP solved by OBGP, according to an embodiment. Link or router failures may result in non-convergent systems in BGP. The SURPRISE system is an example of this case presented in [7], FIG. 7A through FIG. 7D show ASes as circles with labels A<B<C<D<E<F. The destination node nd is in $AS_F$.

FIG. 7A shows the routing state at the routers in all the ASes when the session between $AS_E$ and $AS_F$ fails. The initial largest label routes include AF at $AS_A$; BEF at $AS_B$; CBEF at $AS_C$; DCBEF at $AS_D$; and EF at $AS_E$, respectively. The routes using the link EF, including the routes EF, DCBEF, BEF, and CBEF, at $AS_E$, $AS_D$, $AS_B$ and $AS_C$, respectively, are impacted by the lost connection between $AS_E$ and $AS_F$, because they lose their last link. FIG. 7B illustrates the fact that routers in $AS_E$ do not have any loop-free route to nd in $AS_F$ because none of the local choices satisfies LF (Equation 3b). Accordingly, such routers must send updates with $\pi_{nd}^{ASE}=\pi_\infty$. FIG. 7B shows in dashed lines the AS link corresponding to routes affected by the necessary deletion of the AS route EF. FIG. 7C shows that routers in $AS_C$, $AS_B$ and $AS_D$ determine that their reported paths to nd must be updated because they contain link EF as part of their own reported routes; however, the routers find alternate one or more routes with labels that satisfy LF and send the corresponding updates stating the routes with the maximum labels among those locally available. As FIG. 7D shows, routers in all ASes, including $AS_E$, quickly find one or multiple loop-free routes to nd and report the maximum label among all those labels that satisfy LF. Specifically, $AS_B$ replaces BEF with BAF; $AS_C$ replaces CBEF with CAF, CBAF, CDAF, and CDBAF; $AS_D$ replaces DCBEF with DAF and DBAF and DCBAF; $AS_E$ replaces EF with EBAF, ECAF, ECBAF, ECDBAF, ECDAF, EDBAF, and EDAF. Routers in each AS then advertise the route with the largest label. Specifically, routers in $AS_B$ advertise BAF; routers in $AS_C$ advertise CDBAF; routers in $AS_D$ advertise DBAF and not the larger value DCBAF because $AS_C$ is already advertising a route with D in it; and $AS_E$ advertises ECDBAF.

4. EXAMPLE EMBODIMENTS

An example embodiment called Ordered Distance Vector Routing (ODVR) is worked out above in detail with a variety of different conditions. This example embodiment combines the benefits of on-demand and proactive loop-free routing. The statements made about ODVR apply to the ODVR embodiment but not necessarily to other embodiments.

5. ROUTING HARDWARE OVERVIEW

Figure 8:
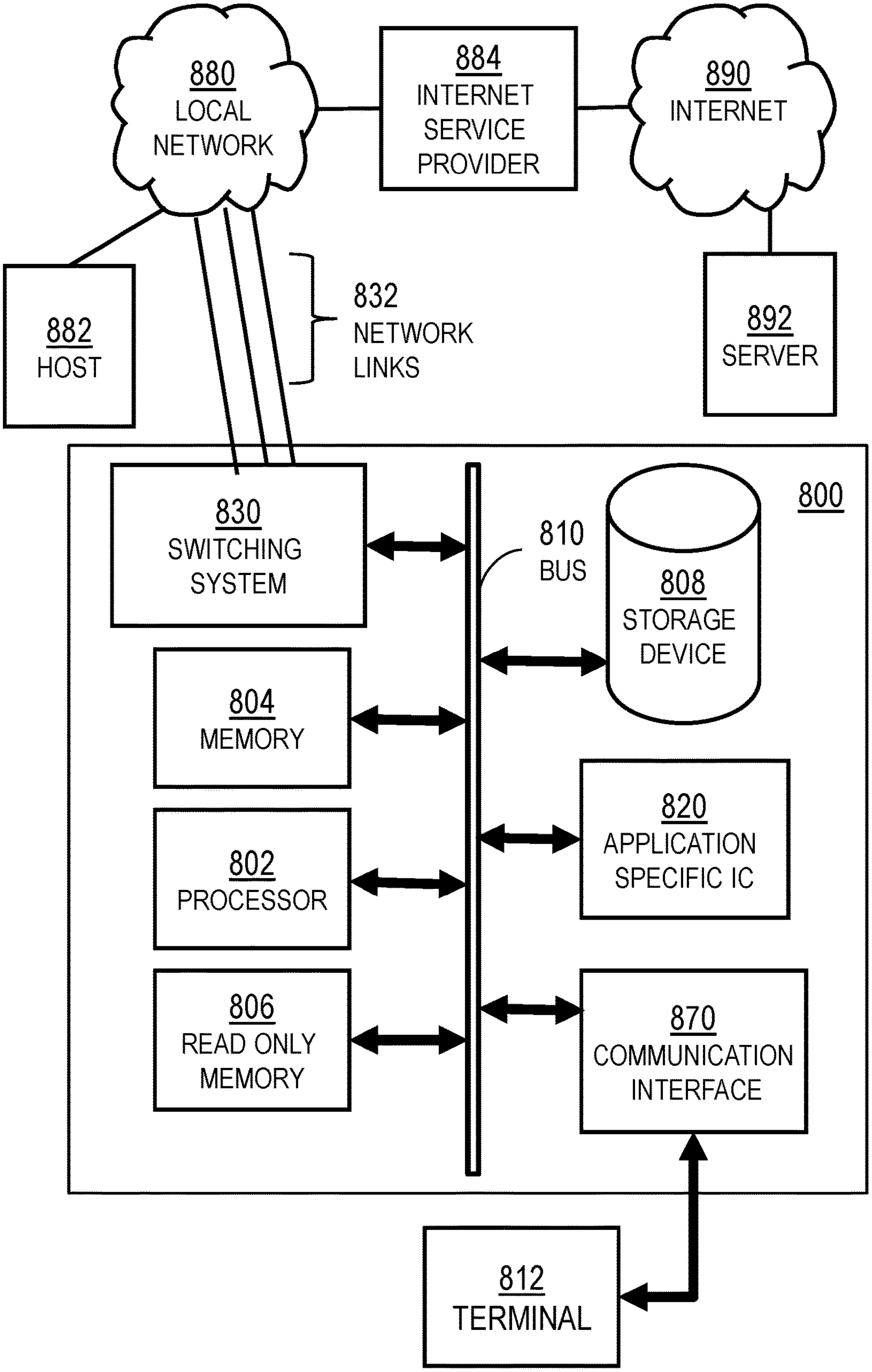
FIG. 8 is a block diagram that illustrates a networking computer system upon which an embodiment of the invention may be implemented.

FIG. 8 is a block diagram that illustrates a computer system 800 upon which an embodiment of the invention may be implemented. Computer system 800 includes a communication mechanism such as a bus 810 for passing information between other internal and external components of the computer system 800. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of one or more methods described herein.

A sequence of binary digits constitutes digital data that is used to represent a number or code for a character. A bus 810 includes many parallel conductors of information so that information is transferred quickly among devices coupled to the bus 810. One or more processors 802 for processing information are coupled with the bus 810. A processor 802 performs a set of operations on information. The set of operations include bringing information in from the bus 810 and placing information on the bus 810. The set of operations also typically include comparing two or more units of information, shifting positions of units of information, and combining two or more units of information, such as by addition or multiplication. A sequence of operations to be executed by the processor 802 constitutes computer instructions.

Computer system 800 also includes a memory 804 coupled to bus 810. The memory 804, such as a random access memory (RAM) or other dynamic storage device, stores information including computer instructions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of computer instructions. The computer system 800 also includes a read only memory (ROM) 806 or other static storage device coupled to the bus 810 for storing static information, including instructions, that is not changed by the computer system 800. Also coupled to bus 810 is a non-volatile (persistent) storage device 808, such as a magnetic disk, optical disk, or FLASH-EPROM, for storing information, including instructions, that persists even when the computer system 800 is turned off or otherwise loses power.

Information, including instructions, is provided to the bus 810 for use by the processor from an external input device 812, such as a keyboard containing alphanumeric keys operated by a human user, or a sensor. A sensor detects conditions in its vicinity and transforms those detections into signals compatible with the signals used to represent information in computer system 800. Other external devices coupled to bus 810, used primarily for interacting with humans, include a display device 814, such as a cathode ray tube (CRT) or a liquid crystal display (LCD), for presenting images, and a pointing device 816, such as a mouse or a trackball or cursor direction keys, for controlling a position of a small cursor image presented on the display 814 and issuing commands associated with graphical elements presented on the display 814.

In the illustrated embodiment, special purpose hardware, such as an application specific integrated circuit (IC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 800 includes switching system 830 as special purpose hardware for switching information flow over a network. Switching system 830 typically includes multiple communications interfaces, such as communications interface 870, for coupling to multiple other devices. In general, each coupling is with a network link 832 that is connected to another device in or attached to a network, such as local network 880 in the illustrated embodiment, to which a variety of external devices with their own processors are connected. In some embodiments an input interface or an output interface or both are linked to each of one or more external network elements. Although three network links 832*a*, 832*b*, 832*c* are included in network links 832 in the illustrated embodiment, in other embodiments, more or fewer links are connected to switching system 830. Network links 832 typically provides information communication through one or more networks to other devices that use or process the information. For example, network link 832*b* may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890. A computer called a server 892 connected to the Internet provides a service in response to information received over the Internet. For example, server 892 provides routing information for use with switching system 830.

The switching system 830 includes logic and circuitry configured to perform switching functions associated with passing information among elements of network 880, including passing information received along one network link, e.g. 832*a*, as output on the same or different network link, e.g., 832*c*. The switching system 830 switches information traffic arriving on an input interface to an output interface according to pre-determined protocols and conventions that are well known. In some embodiments, switching system 830 includes its own processor and memory to perform some of the switching functions in software. In some embodiments, switching system 830 relies on processor 802, memory 804, ROM 806, storage 808, or some combination, to perform one or more switching functions in software. For example, switching system 830, in cooperation with processor 804 implementing a particular protocol, can determine a destination of a packet of data arriving on input interface on link 832*a* and send it to the correct destination using output interface on link 832*c*. The destinations may include host 882, server 892, other terminal devices connected to local network 880 or Internet 890, or other routing and switching devices in local network 880 or Internet 890.

Computer system 800 also includes one or more instances of a communications interface 870 coupled to bus 810. Communication interface 870 provides a two-way communication coupling to a variety of external devices that operate with their own processors, such as printers, scanners and external disks. In general the coupling is with a network link 832 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. As another example, communications interface 870 may be a modulator-demodulator (modem) to provide a wireless link to other devices capable of receiving information wirelessly. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 870 sends and receives electrical, acoustic or electromagnetic signals, including infrared and optical signals, that carry information streams, such as digital data.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 802, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 802, except for carrier waves and other signals.

Logic encoded in one or more tangible media includes one or both of processor instructions on a computer-readable storage media and special purpose hardware, such as ASIC 820.

The invention is related to the use of computer system 800 for implementing the techniques described herein. According to one embodiment of the invention, those techniques are performed by computer system 800 in response to processor 802 executing one or more sequences of one or more instructions contained in memory 804. Such instructions, also called software and program code, may be read into memory 804 from another computer-readable medium such as storage device 808. Execution of the sequences of instructions contained in memory 804 causes processor 802 to perform the method steps described herein. In alternative embodiments, hardware, such as application specific integrated circuit 820, may be used in place of or in combination with software to implement the invention. Thus, embodiments of the invention are not limited to any specific combination of hardware and software.

The signals transmitted over network link 832 and other networks through communications interface 870, carry information to and from computer system 800. Computer system 800 can send and receive information, including program code, through the networks 880, 890 among others, through network link 832 and communications interface 870. In an example using the Internet 890, a server 892 transmits program code for a particular application, requested by a message sent from computer 800, through Internet 890, ISP equipment 884, local network 880 and communications interface 870. The received code may be executed by processor 802 as it is received, or may be stored in storage device 808 or other non-volatile storage for later execution, or both. In this manner, computer system 800 may obtain application program code in the form of a signal on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red a carrier wave serving as the network link 832. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

6. ALTERATIONS, DEVIATIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

7. REFERENCES

Each of the references cited is hereby incorporated by reference as if fully set forth herein, except for terminology inconsistent with that used herein.

[1] ANSI, "Intermediate System to Intermediate System Inter-Domain Routing Information Exchange Protocol," ANSI Doc. X3S3.3/90-132, 1990.

[2] B. Carre, Graphs and Networks, Clarendon Press, 1979.

[3] C. K. Chau et al., "Towards a Unified Theory of Policy-Based Routing," Proc. IEEE Infocom 26 Apr. 2006.

[4] D. Estrin et al., "A Protocol for Route Establishment and Packet Forwarding across Multidomain Internets," IEEE/ACM Trans. on Networking, February 1993.

[5] Cisco Systems, "BGP Best Path Selection Algorithm," Document ID 13753, September 2016.

[6] L. Gao and J. Rexford, "Stable Internet Routing without Global Coordination," IEEE/ACM Trans. Networking, 2001.

[7] T. G. Grifin and G. Wilfong, "An Analysis of BGP Convergence Properties," Proc. ACM SIGOMM '99, August 1999.

[8] T. G. Griffin and G. Wilfong, "A Safe Path Vector Protocol," Proc. IEEE INFOCOM 20 Mar. 2000.

[9] C. Labovitz et al., "Delayed Internet Routing Convergence," Proc. ACM SIGCOMM 20 Aug. 2000.

[10] Z. Mao et al., "Route Flap Damping Exacerbates Internet Routing Convergence," Proc. ACM SIGCOMM 22 Aug. 2002.

[11] R. Musunuri and J. A. Cobb, "A Complete Solution for iBGP Stability," Proc. IEEE ICC '04, June 2004.

[12] Y. Rekhter, T. Li, and S. Hares, "A Border Gateway Protocol 4 (BGP-4)," RFC 4271 January 2005.

[13] B. R. Smith and J. Samson, "Herding packets: Properties Needed of Metrics for Loop-Free & Best Forwarding Paths," Proc. IEEE ICNC '17, 2017.

[14] J. L. Sobrinho, "Network Routing with Path Vector Protocols: Theory and Applications," Proc. ACM SIGCOMM '03, August 2003.

[15] I. van Beijnum et al., "Loop-Freeness in Multipath BGP through Propagating the Longest Path," Proc. IEEE ICC '09 Workshops, 2009.

[16] W. Xu and J. Rexford, "MIRO: Multi-path Interdomain Routing," Proc. ACM SIGCOMM '06, 2006.

[17] W. T. Zaumen and J. J. Garcia-Luna-Aceves, "System for Maintaining Multiple Loop-Free Paths between Source Node and Destination Node in Computer Network," U.S. Pat. No. 5,881,243, Mar. 9, 1999.

What is claimed is:

1. A method implemented on a processor of a node in a communications network to report a route to a destination in a different autonomous system, the method comprising:

receiving, at a first border node in a first autonomous system from a neighbor second border node in a second autonomous system, a first routing control packet for a route to a destination node, wherein the packet indicates the destination node and a next hop node in the second autonomous system and a first ordered list of any other autonomous systems involved in the route, wherein the ordered list indicates each autonomous system in an order each autonomous system is traversed along the route;

determining whether the first ordered list indicates the first autonomous system; and if the first ordered list does not include the first autonomous system then accepting a loop free route to the destination node by storing in a routing table at the first border node a route record for the destination node that indicates the destination node and the neighbor second border node and an updated ordered list that includes the ordered list and also indicates the second autonomous system, and sending a second routing control packet to neighboring nodes in the first autonomous system, wherein the second routing control packet indicates the destination node and the updated ordered list.

2. The method as recited in claim 1, wherein the first ordered list indicates no route exists if the second autonomous system has lost connection with the destination node.

3. The method as recited in claim 1, wherein the ordered list indicates a unique value for each autonomous system indicated.

4. The method as recited in claim 3, wherein the unique value for each autonomous system is based on a label for such autonomous system or a cost of traversing such autonomous system or some combination.

5. The method as recited in claim 1, further comprising, upon receiving at an arbitrary node in the first autonomous system a third routing control packet that indicates a request for a route to the destination node:

selecting a preferred route from a preferred route record from a routing table at the arbitrary node, wherein the preferred route record includes an ordered list that has a value greater than or equal to any different value for any different route record from the routing table at the arbitrary node; and sending a fourth routing control packet that indicates the preferred route.

6. A non-transitory computer-readable medium carrying one or more sequences of instructions, wherein execution of the one or more sequences of instructions by one or more processors causes the one or more processors to perform the steps of the methods of claim 1.

7. An apparatus comprising:

at least one processor;

a communications switching system; and at least one memory including one or more sequences of instructions, the at least one memory and the one or more sequences of instructions configured to, with the at least one processor, cause the apparatus to perform the steps of the method of claim 1.

8. A system comprising a plurality of nodes in a communication network wherein each nodes comprises:

at least one processor;

a communications switching system; and at least one memory including one or more sequences of instructions, the at least one memory and the one or more sequences of instructions configured to, with the at least one processor, cause the apparatus to perform the steps of the method of claim 1.

* * * * *